United States Patent [19]

Weill et al.

[11] Patent Number: 4,786,328

[45] Date of Patent: Nov. 22, 1988

[54] MAGNESIUM PHOSPHATE CEMENT SYSTEMS

[75] Inventors: Ed Weill, Baltimore; L. Joseph Bradik, Bel Air, both of Md.

[73] Assignee: American Stone-Mix, Inc., Towson, Md.

[21] Appl. No.: 176,656

[22] Filed: Apr. 1, 1988

Related U.S. Application Data

[62] Division of Ser. No. 74,527, Jul. 16, 1987, Pat. No. 4,756,762.

[51] Int. Cl.$^4$ .................. C04B 9/02; C04B 24/04; C04B 24/06
[52] U.S. Cl. ........................................ 106/85; 106/121
[58] Field of Search .................................... 106/85, 121

[56] References Cited

U.S. PATENT DOCUMENTS

| | | | |
|---|---|---|---|
| 3,658,563 | 4/1972 | Washio et al. | 106/55 |
| 3,743,525 | 7/1973 | Farrauto et al. | 106/74 |
| 3,821,006 | 6/1974 | Schwartz | 106/85 |
| 3,960,580 | 6/1976 | Stierli et al. | 106/85 |
| 4,070,195 | 1/1978 | Toeniskoetter et al. | 106/85 |
| 4,089,692 | 5/1978 | Toeniskoetter et al. | 106/85 |
| 4,226,626 | 10/1980 | Toeniskoetter et al. | 106/85 |
| 4,436,555 | 3/1984 | Sugama et al. | 106/85 |
| 4,466,835 | 8/1984 | Crump et al. | 106/90 |

OTHER PUBLICATIONS

Publication entitled 'Fly Ash Utilization', by Capp et al, 1970, pp. 1-4.

*Primary Examiner*—William R. Dixon, Jr.
*Assistant Examiner*—David M. Brunsman
*Attorney, Agent, or Firm*—DeLio & Associates

[57] ABSTRACT

A mixture capable of forming a hard, bonded cement composition when admixed with water comprising magnesium oxide; a water soluble phosphate; a retarder selected from the group consisting of polycarboxylic acids, polyphosphonic acids, and salts of such acids; and an essentially inert aggregate filler. The retarder is preferably selected from the group consisting of citric acid, sodium citrate (monobasic), sodium citrate (dibasic), tartaric acid, trimellitic acid, nitrilotriacetic acid trisodium salt monohydrate, Dequest 2000 and Dequest 2006. The phosphate is preferably monoammonium phosphate and the filler is preferably silica sand and fly ash which are essentially free of calcium oxide and calcium carbonate. The mixture is admixed with water at a job site and used to fill holes in roads and other structures and is capable of being worked for at least seven minutes before initial set.

18 Claims, No Drawings

MAGNESIUM PHOSPHATE CEMENT SYSTEMS

This is a division of application Ser. No. 074,527 filed on July 16, 1987, now U.S. Pat. No. 4,756,762.

BACKGROUND OF THE INVENTION

The present invention relates to an improved magnesium phosphate cement system, and in particular, to an improved magnesium phosphate cement system in which a set retarder is employed to produce a workable yet durable high strength patching system for use in roadways and other structure surfaces.

While the use of magnesium phosphate cement systems in general has been well known in the prior art, the use of such systems as a road patch has been severly limited because of the rapid setting of such systems. Usually magnesium phosphate cement systems have initial set times of less than 7 minutes (as measured by ASTM C-191) and may be as little as 4 minutes or less.

Certain retarders have been suggested for such patch systems, for example, oxy-boron compounds disclosed in U.S. Pat. No. 3,960,580. However, many of these prior art retarders seriously affect the strength and other characteristics of the resulting patch, making them undesirable for such use. In case of the oxy-boron class retarders, the amount of retarder which is generally employed—on the order of about one-half percent by weight—is so small that in practice there are problems in properly dispersing it throughout the mix. Amounts of oxy-boron retarder in excess of this greatly increase the initial set time beyond the desired 15 to 20 minute maximum (at room temperature). Should a road patch takes too long to set, it will not gain strength sufficiently fast, thereby resulting in early deterioration of the patch. Minimum compressive strength of the patch should be about 3000 psi after one hour. Other problems with prior art cement systems include problems associated with storage and use for example, poor flow characteristics and the necessity to mix more than two components together prior to use, which presents substantial inconveniences at a job site or other field application.

Bearing in mind these and other deficiencies of the prior art, it is therefore an object of the present invention to provide an improved patch and repair system which develops high strength quickly but still allows time for placement and working of the patch material.

It is another object of the present invention to develop a retarder for a magnesium phosphate cement system which is easily dispersed throughout the mix yet does not significantly affect early strength and other desirable characteristics of the material.

It is a further object of the present invention to provide a magnesium phosphate cement system which may be stored as a premixed, one component, dry powder until ready for use by mixture with water.

It is another object of the present invention to provide a magnesium phosphate patch and repair system with improved flow characteristics during mixing and working.

It is a further object of the present invention to provide a patch and repair system which sets in from 7 to 15 minutes at room temperature while attaining a minimum compressive strength of 3000 psi after one hour.

It is yet another object of the present invention to provide a patch and repair system which is durable, non-shrinking and develops strong bonding and adhesion with the structure or surface being repaired.

It is a further object of the present invention to provide a magnesium phosphate cement system which is useful in application for repairing roads and other structures in which speed of repair and strength is essential.

SUMMARY OF THE INVENTION

The above and other objects, which will be apparent to those skilled in the art, are achieved by the present invention which relates to a mixture capable of forming a hard, bonded cement composition when admixed with water comprising magnesium oxide; a water soluble phosphate; a retarder selected from the group consisting of polycarboxylic acids, polyphosphonic acids, and salts of such acids; and an essentially inert aggregate filler. The retarder is preferably selected from the group consisting of citric acid, sodium citrate (monobasic), sodium citrate (dibasic), tartaric acid, trimellitic acid, nitrilotriacetic acid trisodium salt monohydrate, Dequest 2000 and Dequest 2006. The phosphate is preferably monoammonium phosphate and the filler is preferably silica sand and fly ash which are essentially free of calcium oxide and calcium carbonate. The mixture is admixed with water at a job site and used to fill holes in roads and other structures and is capable of being worked for at least seven minutes before initial set.

DETAILED DESCRIPTION OF THE INVENTION

The improved repair and patch system of the present invention is preferably used as a dry, comminuted, one component system which is admixed with water at the intended job site just prior to use. The mixture of the present invention consists of a both reactive and inert constituents. The reactive constituents comprise magnesium oxide (MgO), a water soluble phosphate such as monoammonium phosphate ($NH_4H_2PO_4$) and a retarder which may be a polycarboxylic acid, a polyphosphonic acid, or a salt of such acids. The essentially inert constituents are fillers which also control the flow and workability of the improved repair and patch system. Where certain constituents, such as the water soluble phosphates, are to be employed in liquid or aqueous form, they may be premixed with the water and added to the other constituents at the job site.

The water soluble phosphate constituent is preferably monoammonium phosphate, a monobasic crystal salt which has a pH of about 4.3 and is sold in a technical grade by Agrico Chemical Company. Preferably it is finer than 100 mesh (U.S. Standard). Other phosphates may be used, such as orthophosphate, and orthophosphate salts, in either liquid or solid form, (e.g. aluminum-, magnesium-, and sodium phosphates), either in conjunction with or as a replacement for monoammonium phosphate. The water soluble phosphate may generally comprise from about 5 to about 30 weight percent of the total dry mixture of the present invention, preferably from about 10 to 15 weight percent, and more preferably from about 11 to 13 weight percent. Monoammonium phosphate is preferred because it is directly soluble in water from its solid state, it produces an essentially insoluble final product, and it combines to leave less excess water after reaction. In processing, the monoammonium phosphate has a tendency to form lumps that are difficult to break down during subsequent blending and mixing, and therefore it is generally advisable to size it to the aforementioned mesh size prior to mixing with the other dry constituents.

The second constituent of the dry powder component of the present invention is magnesium oxide (MgO), also known as magnesia. It is preferably utilized in a high purity technical grade which has high density, low reactivity and is slightly basic (pH of about 9.0) when combined with water. It is preferably used in less than 200 mesh size (U.S. Standard). Magnesium oxide may be optionally used in conjunction with other alkali or alkaline earth oxides for example, calcium oxide, other alkali or alkaline earth carbonates, for example, calcium carbonate, and mixtures of these compounds. The magnesium oxide may also be provided in the form of dolomitic oxide, a mixture of magnesium and calcium oxides and carbonates. Calcium oxides and carbonates generally should be avoided, however, because they undesirably react with the phosphate constituent. Where these compounds are present, the amount of phosphate employed must be increased. The magnesium oxide should generally constitute from about 4 to about 20 weight percent of the total dry powder constituent of the present invention. Preferably a range of about 8 to 12 weight percent is utilized, with the range of about 9 to 10 percent being more preferred.

The retarder utilized in the patch and repair system of the present invention is preferably in a fine granular form and is soluble in water. A first group of suitable retarders include polycarboxylic acids and soluble metal salts of these acids. As used herein, the term "polycarboxylic acid" refers to a compound having two or more carboxylic acid groups (COOH) thereon. Suitable salts of such polycarboxylic acids are preferably not fully substituted, i.e. they will contain at least one complete COOH group. Such suitable polycarboxylic acid and salt compounds include citric acid, sodium citrate (dibasic), sodium citrate (monobasic), tartaric acid, trimellitic acid (hydrous), and nitrilotriacetic acid trisodium salt (monohydrate). Citric acid is the preferred retarder.

As an alternative to the class of retarders above, or in conjunction therewith, the retarder may be a polyphosphonic acid or soluble metal salt thereof. As used herein, the term "polyphosphonic acid" refers to a compound having thereon a plurality of phosphonic acid groups:

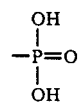

Suitable retarders of this class include Dequest 2000, identified as nitrilotris(methylene)tris(phosphonic acid) $(N(CH_2PO_3H_2)_3$, CAS No. 6419-19-8) and Dequest 2006, identified as nitrilotris(methylene)tris (phosphonic acid) pentasodium salt $(N(CH_2PO_3Na_2)_2CH_2PO_3HNa$, CAS No. 2235-43-0), available from Monsanto Co. Preferably the salts of the polyphosphonic acids will not be fully substituted, i.e. at least one phosphonic acid group will have thereon at least one (OH) group.

The retarder may be utilized in an amount from about 0.1 to about 5.0 weight percent of the total dry powder mixture of the present invention. Preferably an amount from 0.5 to 2.0 weight percent is utilized, with the range of 1.0 to 1.5 weight percent being more preferred.

The essentially inert constituent in the dry powder mixture of the present invention is an aggregate filler. The aggregate filler may be any suitable "dead burned" or non-reactive oxide or other filler, for example, aluminum oxide, and is preferably silica sand. To avoid possible reaction with the phosphate, the filler should be very low in and essentially free of calcium oxides and any carbonates, i.e. less than 0.5 weight percent for the former and less than 0.1 weight percent for the latter. The size and angularity of the filler particles should be selected to improve the flow characteristics of the dry powder component of the present invention. Generally, the larger the filler particles, the lower the surface area thereof and the higher the resulting powder flow. Also, the less angular filler particles have lower surface area and higher flow characteristics. Silica sand should be between 50 and 75 percent +20 mesh (U.S. Standard), with little or no sand +4 mesh. The total amount of aggregate filler may comprise from about 30 to about 91 weight percent of the total dry mix, with an amount of about 61 to about 80 percent being preferred.

To improve the flow characteristics of the dry powder mix of the present invention, there is preferably included fly ash as an inert component thereof. The fly ash utilized is preferably Type F since this contains essentially no calcium oxides and carbonates. Type C fly ash, which contains these compounds, should be avoided since there may be an undesirable reaction with the phosphate to form carbon dioxide gas which causes swelling and strength degradation. The fly ash should be relatively fine in particle size and is preferably 75 percent through 200 mesh (U.S. Standard). Such fly ash may be obtained from National Minerals Company. The fly ash may be used in an amount from about 4 to 15 weight percent of the dry powder mixture, with about 5 to 9 weight percent being preferred. In addition to the flow characteristics imparted to the dry mix, the fly ash also imparts a gray color which is generally desirable to the aesthetics of a patch or repair.

To activate the dry powder mixture of the present invention, water is added in a suitable amount, preferably about 1 gallon to approximately 100 pounds of dry mixture (8.33 weight percent of the total).

The basic reaction in a magnesium phosphate cement system occurs between the magnesium oxide and the monoammonium phosphate at the surface of the magnesium oxide particle. The proper ratio of magnesium oxide to monoammonium phosphate is important because if the relative amount of magnesium oxide is too low, the mass hardens prior to full reaction of the monoammonium phosphate. This leaves a mass with soluble material which is not suitable for use. Conversely, an excess amount of magnesium oxide will react too quickly causing very high heat output which may boil the water in the mix and damage the resulting product. In the setting reaction, the magnesium oxide particle is attacked by water or hydrogen ions to produce $(Mg(OH)_2$ and $Mg++$ ions at the surface. This surface is solubilized by the acidic phosphate to produce a solution of $MgHPO_4$ which is then insolubilized by conversion to $MgNH_4PO_4$ by the ammonium ion in the solution. This insoluble material precipitates and hydrates by absorbing $H_2O$ molecules into its lattice. Although not wishing to be bound by theory, it is believed that the retarders of the present invention operate by coating the $MgOH_2$ and $Mg++$ surface of the magnesium oxide particle with relatively insoluble $Mg\text{-}O_2C\text{-}R\text{-}CO_2\text{-}Mg$ molecules. This restricts the dissolution of MgHPO4 and becomes the rate determining step of the reaction.

The dry mixture of the present invention when combined with water will have an initial set time of from about 7 to about 12 minutes and a final set time from about 8 to about 15 minutes, as determined by ASTM C-191. Thus, the present invention will provide a "pot life" which will allow sufficient time to mix and work the composition at the job site. The mixing and working of the water and dry powder mixture may be performed at room temperature (73° F. plus or minus 2 degrees) and should produce a strength of at least 3,000 psi after one to one and a half hours, as measured in standard compression testing of 2 inch cubes. Production samples of the present invention, in which initial set times were delayed to between 7 and 12 minutes, have exhibited compression strengths of about 4,000 to 5,000 psi after one hour.

When used in filling holes in road surfaces or repairing other voids in structures, the hole or void should be prepared by removing damaged material down to solid substrate and then flushing with high pressure air to remove dust. The substrate surface should then be dampened with water without leaving any standing water. The water-mixed powder of the present invention is then trowled or poured into the hole or void and worked into the desired shape. For voids deeper than 3 inches, the mixture should be further modified by adding 50 to 60 pound of gravel per 100 pounds of dry powder mixture.

The following non-limiting example sets forth a comparison of certain preferred embodiments of the present invention to demonstrate the effect and advantages of the retarder constituents discussed above.

EXAMPLE

The following mixtures were made to produce cements with and without the retarder constituents of the present invention. The mixtures were made at room temperature and the constituents were blended in a Hobart blender.

| Dry Powder Constituents | Formula A (weight percent) | Formula B (weight percent) |
|---|---|---|
| magnesium oxide (MgO) | 10.8 | 10.96 |
| monoammonium phosphate | 12.0 | 12.18 |
| fly ash - type F | 6.0 | 6.09 |
| coarse silica sand (95% + 20 mesh) | 48.7 | 49.45 |
| fine silica sand (30% + 20 mesh) | 21.0 | 21.32 |
| retarder | 1.5 | none |
|  | 100 | 100 |

After forming a dry powder mixture of the above constituents, each was mixed with one gallon of water per 100 pounds of dry mixture. The set times, in minutes, were determined according to ASTM C-191 to be as follows:

| Formula | Retarder | Set Times Initial | Final |
|---|---|---|---|
| A1 | Citric Acid | 9½ | 10½ |
| A2 | Sodium Citrate dibasic | 14½ | 15½ |
| A3 | Sodium Citrate monobasic | 13 | 15½ |
| A4 | Tartaric Acid | 9¼ | 10¼ |
| A5 | Trimellitic Acid (hydrous) | 12 | 13 |
| A6 | Nitrilotriacetic acid trisodium salt (monohydrate) | 9¼ | 11 |
| A7 | DEQUEST 2000 | 11¾ | 13¾ |
| A8 | DEQUEST 2006 | 15½ | 17¼ |
| B | None | 4¼ | 5¼ |

From the above it can be seen that the present invention provides a fast setting magnesium phosphate cement system wherein set times may be extended without significantly affecting the strength of the finished material. Thus, the present invention is highly useful in road patching or other structural repairs wherein only a limited time is available to make the repair and achieve high strength and bonding in the repaired area.

While this invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A dry mixture capable of forming a hard, bonded cement composition when admixed with water comprising:
   magnesium oxide;
   monoammonium phosphate;
   a retarder selected from the group consisting of polycarboxylic acids and salts of such acids; and
   an essentially inert aggregate filler.

2. The mixture of claim 1 wherein said filler is essentially free of calcium oxide and calcium carbonate.

3. The mixture of claim 2 wherein said filler is selected from the group consisting of silica sand and fly ash.

4. The mixture of claim 3 wherein said filler comprises fly ash in an amount between about 4 and 15 weight percent of said mixture.

5. The mixture of claim 1 wherein said magnesium oxide comprises between about 4 and about 20 weight percent of said mixture, said monoammonium phosphate comprises between about 5 and about 20 weight percent of said mixture, and said retarder comprises between about 0.1 and 5.0 weight percent of said mixture.

6. The mixture of claim 1 wherein said retarder comprises between about 0.5 and 5.0 weight percent of said mixture.

7. The mixture of claim 6 wherein said retarder is selected from the group consisting of citric acid, sodium citrate (monobasic), sodium citrate (dibasic), tartaric acid, and trimellitic acid, and nitrilotriacetic acid trisodium salt monohydrate.

8. The mixture of claim 6 wherein said retarder is citric acid.

9. The mixture of claim 1 wherein said retarder is selected from the group consisting of citric acid, sodium citrate (monobasic), sodium citrate (dibasic), tartaric acid, trimellitic acid, and nitrilotriacetic acid trisodium salt monohydrate.

10. The mixture of claim 9 wherein said filler comprises fly ash in an amount between about 4 and 15 weight percent of said mixture, said fly ash being essentially free of calcium oxide and calcium carbonate.

11. The mixture of claim 1 wherein the retarder salts are not fully substituted.

12. A dry mixture capable of forming a hard, bonded cement composition comprising:
   from about 4 to about 20 weight percent of magnesium oxide;
   from about 5 to about 20 weight percent of monoammonium phosphate;
   from about 0.1 to about 5.0 weight percent of a retarder selected from the group consisting of polycarboxylic acids and not fully substituted soluble salts of such acids; and
   an inert aggregate filler essentially free of calcium oxides and any carbonates.

13. The mixture of claim 12 wherein said filler is selected from the group consisting of silica sand and fly ash.

14. The mixture of claim 12 wherein said retarder comprises between about 0.5 to 5.0 weight percent of said mixture.

15. The mixture of claim 12 wherein said filler comprises fly ash in an amount between about 4 and 15 weight percent of said mixture.

16. The mixture of claim 15 wherein said retarder is selected from the group consisting of citric acid, sodium citrate (monobasic), sodium citrate (dibasic), tartaric acid, trimellitic acid, and nitrilotriacetic acid trisodium salt monohydrate.

17. The mixture of claim 12 wherein said retarder is selected from the group consisting of citric acid, sodium citrate (monobasic), sodium citrate (dibasic), tartaric acid, trimellitic acid, and nitrilotriacetic acid trisodium salt monohydrate.

18. The mixture of claim 12 wherein said retarder is citric acid.

* * * * *